(12) United States Patent
Sjoland et al.

(10) Patent No.: US 9,344,139 B2
(45) Date of Patent: May 17, 2016

(54) TRANSCEIVER, METHOD, COMPUTER PROGRAM AND COMMUNICATION DEVICE

(71) Applicant: Telefonaktiebolaget L M Ericsson (publ), Stockholm (SE)

(72) Inventors: Henrik Sjoland, Lund (SE); Stefan Andersson, Lund (SE); Imad ud Din, Lund (SE); Johan Wernehag, Malmo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/373,419

(22) PCT Filed: Jan. 25, 2013

(86) PCT No.: PCT/EP2013/051520
§ 371 (c)(1),
(2) Date: Jul. 21, 2014

(87) PCT Pub. No.: WO2013/110799
PCT Pub. Date: Aug. 1, 2013

(65) Prior Publication Data
US 2014/0364073 A1  Dec. 11, 2014

Related U.S. Application Data

(60) Provisional application No. 61/594,014, filed on Feb. 2, 2012.

(30) Foreign Application Priority Data

Jan. 26, 2012  (EP) .................................. 12152639

(51) Int. Cl.
*H04B 1/38*  (2015.01)
*H04B 1/40*  (2015.01)
*H04B 1/525*  (2015.01)

(52) U.S. Cl.
CPC . *H04B 1/40* (2013.01); *H04B 1/525* (2013.01)

(58) Field of Classification Search
CPC ....................................................... H04B 1/38
USPC .......... 455/63.1, 67.13, 73, 114.2, 126, 226.2
See application file for complete search history.

(56) References Cited

U.S. PATENT DOCUMENTS 6,169,912 B1 * 1/2001 Zuckerman ................... 455/570
6,745,018 B1   6/2004 Zehavi et al.
(Continued)

OTHER PUBLICATIONS

PCT International Search Report, mailed May 2, 2013, in connection with International Application No. PCT/EP2013/051520, all pages.
(Continued)

*Primary Examiner* — Tuan H Nguyen
(74) *Attorney, Agent, or Firm* — Leffler Intellectual Property Law, PLLC

(57) ABSTRACT

A transceiver is disclosed comprising a transmitter; a receiver; and a signal transmission arrangement. The transmitter comprises a power amplifier, and the signal transmission arrangement is arranged to transmit signals provided from the transmitter through its power amplifier, and arranged to receive signals and provide them to the receiver. The transceiver further comprises an auxiliary power amplifier which has controllable phase shift and gain; a first impedance element; a second impedance element; and a controller. The auxiliary power amplifier has its input connected to the input of the power amplifier of the transmitter, the first impedance element is connected between an output of the auxiliary power amplifier and an input of the receiver, the second impedance element is connected between an output of the power amplifier of the transmitter and the input of the receiver, and the controller is arranged to control the auxiliary power amplifier to provide a signal that has a phase and amplitude in relation to the output of the power amplifier of the transmitter and the impedances of the first and second impedance elements such that the transmitter contribution at the input of the receiver is suppressed. A method, computer program and communication device is also disclosed.

20 Claims, 6 Drawing Sheets

(56) References Cited

U.S. PATENT DOCUMENTS

| | | |
|---|---|---|
| 7,756,480 B2 * | 7/2010 | Loh ............................ 455/63.1 |
| 2007/0015468 A1 | 1/2007 | Kouki et al. |
| 2007/0217488 A1 | 9/2007 | Smaini et al. |
| 2008/0198773 A1 | 8/2008 | Loh |
| 2010/0304701 A1 | 12/2010 | Jung et al. |
| 2011/0064004 A1 | 3/2011 | Mikhemar et al. |

OTHER PUBLICATIONS

PCT Written Opinion, mailed May 2, 2013, in connection with International Application No. PCT/EP2013/051520, all pages.

* cited by examiner

TRANSCEIVER, METHOD, COMPUTER PROGRAM AND COMMUNICATION DEVICE

CROSS-REFERENCE TO RELATED APPLICATIONS

This application claims priority under 35 U.S.C. §119 to European Patent Application No. 12152639.6, filed Jan. 26, 2012, which is hereby incorporated herein by reference in its entirety. This application also claims the benefit of U.S. Provisional Application No. 61/594,014, filed Feb. 2, 2012, which is hereby incorporated herein by reference in its entirety.

TECHNICAL FIELD

The present invention generally relates to a transceiver, a method of operating the transceiver, and a computer program for implementing the method. The present invention also relates to a communication device capable of frequency division duplex communication comprising such a transceiver.

BACKGROUND

Transceivers comprise both a transmitter and a receiver, and are commonly used in a variety of communication apparatuses. Transceivers can be arranged to be operated in semi-duplex, i.e. the receiver and transmitter operates on same frequency but separated in time to prevent the transmitter signal from concealing the received signal. This approach is therefore commonly referred to as time division duplex (TDD). Transceivers can also be operated in full duplex, i.e. the receiver and transmitter operates simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) energy from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. Thus, a first portion of energy is directed towards the antenna for transmission, and a second portion of the energy is directed towards the dummy load where it is dissipated as heat. If the dummy load is configured to have an impedance equal to that of the antenna, the first and second portions are equal, and, when using a differential input to the receiver, the contribution at receiver input from the transmitted signal can be suppressed. An example of such approach is disclosed in US 2011/0064004 A1. However, here it can be seen that transmission energy is lost in heat dissipation in the dummy load.

It is therefore a desire to provide an approach for transceivers where the above discussed drawbacks are reduced.

SUMMARY

An object of the invention is to at least alleviate the above stated problem. The present invention is based on the understanding that by providing a voltage division between outputs of a power amplifier of a transmitter and an auxiliary power amplifier providing the transmit signal with a certain amplitude and phase shift, the voltage division can be such that no contribution of the transmit signal is present. By connecting this point to a receiver input of a transceiver, isolation from the transmitter can be achieved by reduction of the contribution from the transmitter at the receiver input.

According to a first aspect, there is provided a transceiver comprising a transmitter; a receiver; and a signal transmission arrangement. The transmitter comprises a power amplifier, and the signal transmission arrangement is arranged to transmit signals provided from the transmitter through its power amplifier, and arranged to receive signals and provide them to the receiver. The transceiver further comprises an auxiliary power amplifier which has controllable phase shift and gain; a first impedance element; a second impedance element; and a controller. The auxiliary power amplifier has its input connected to the input of the power amplifier of the transmitter, the first impedance element is connected between an output of the auxiliary power amplifier and an input of the receiver, the second impedance element is connected between an output of the power amplifier of the transmitter and the input of the receiver, and the controller is arranged to control the auxiliary power amplifier to provide a signal that has a phase and amplitude in relation to the output of the power amplifier of the transmitter and the impedances of the first and second impedance elements such that the transmitter contribution at the input of the receiver is suppressed.

The first impedance element may have controllable impedance, and the second impedance element may have controllable impedance, and the controller may be arranged to control also impedances of the first impedance element and the second impedance element. The output of the auxiliary power amplifier may be controlled to have a relation in phase to the output of the power amplifier of the transmitter and to have an amplitude having a relation to the output of the power amplifier of the transmitter, and the first and second impedance elements may be controlled to have a corresponding relation of their impedances. The output of the auxiliary power amplifier may be controlled to have opposite phase to the output of the power amplifier of the transmitter and to have equal amplitude to the output of the power amplifier of the transmitter, and the first and second impedance elements may have equal impedance.

The controller may be arranged to provide its control by a feedback structure and measure the output of the power amplifier of the transmitter and the output of the auxiliary power amplifier wherein feedback is based on the measurements. Alternatively, the controller may be arranged to measure the transmitter contribution at the input of the receiver wherein feedback is based on the measurement.

The second impedance element may comprise a first and a second impedance connected in series, and the controller may be arranged to provide its control by a feedback structure and measure at a point between the first and second impedances of the second impedance element and the output of the auxiliary power amplifier wherein feedback is based on the measurements.

The transceiver may further comprise a parallel resonance tank circuit including the first and second impedance elements and a third impedance element connected between the output of the auxiliary power amplifier and the power amplifier of the transmitter, wherein the parallel resonance tank is tuned to a frequency of a signal component received by the signal transmission arrangement that is desired to be reduced.

The receiver may further comprise a receiver impedance element at the input of the receiver, the receiver impedance element has controllable impedance, and the controller is arranged to control the receiver impedance element such that the second impedance element and the receiver impedance element together have a resonance frequency equal to a frequency of a signal desired to be received by the receiver.

The first and second impedance element may comprise inductors. Alternatively, the first and second impedance elements may comprise capacitors.

According to a second aspect, there is provided a method for controlling a transceiver comprising a transmitter; a receiver; a signal transmission arrangement where the transmitter comprises a power amplifier, and the signal transmission arrangement is arranged to transmit signals provided from the transmitter through its power amplifier, and arranged to receive signals and provide them to the receiver; an auxiliary power amplifier which has controllable phase shift and gain; a first impedance element; and a second impedance element, where the auxiliary power amplifier has its input connected to the input of the power amplifier of the transmitter, the first impedance element is connected between an output of the auxiliary power amplifier and an input of the receiver, and the second impedance element is connected between an output of the power amplifier of the transmitter and the input of the receiver. The method comprises controlling the auxiliary power amplifier to provide a signal that has a phase and amplitude in relation to the output of the power amplifier of the transmitter and the impedances of the first and second impedance elements such that the transmitter contribution at the input of the receiver is suppressed.

The first impedance element may have controllable impedance and the second impedance element may have controllable impedance, wherein the method further may comprise controlling the impedances of the first and second impedance elements. The controlling may further comprise controlling the auxiliary power amplifier to, at its output, have a relation in phase to the output of the power amplifier of the transmitter and to have an amplitude, at its output, having a relation to the output of the power amplifier of the transmitter, and the first and second impedance elements to have a corresponding relation of their impedances. The controlling may further comprise controlling the auxiliary power amplifier to have, at its output, opposite phase to the output of the power amplifier of the transmitter and to have, at its output, equal amplitude to the output of the power amplifier of the transmitter, and the first and second impedance elements may have equal impedances.

The controlling may further comprise measuring the output of the power amplifier of the transmitter and the output of the auxiliary power amplifier, wherein the controlling is based on feedback control based on the measurements.

The controlling may further comprise measuring the transmitter contribution at the input of the receiver, wherein the controlling is based on a feedback control based on the measurement.

The receiver may further comprise a receiver impedance element at the input of the receiver, wherein the receiver impedance element may have controllable impedance and the method may further comprise controlling the impedance of the receiver impedance element such that the second impedance element and the receiver impedance element together have a resonance frequency equal to a frequency of a signal desired to be received by the receiver.

According to a third aspect, there is provided a computer program comprising computer executable instructions which when executed by a programmable controller of a transceiver causes the controller to perform the method according to the second aspect.

According to a fourth aspect, there is provided a communication device, capable of frequency division duplex communication in a communication network, comprising a transceiver according to the first aspect.

The communication device may be a cellular communication device, such as a mobile phone, cellular communication card, or Wide Area Network communication device, or a communication device for wired communication, such as a cable modem, a repeater device, or a wired network node.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
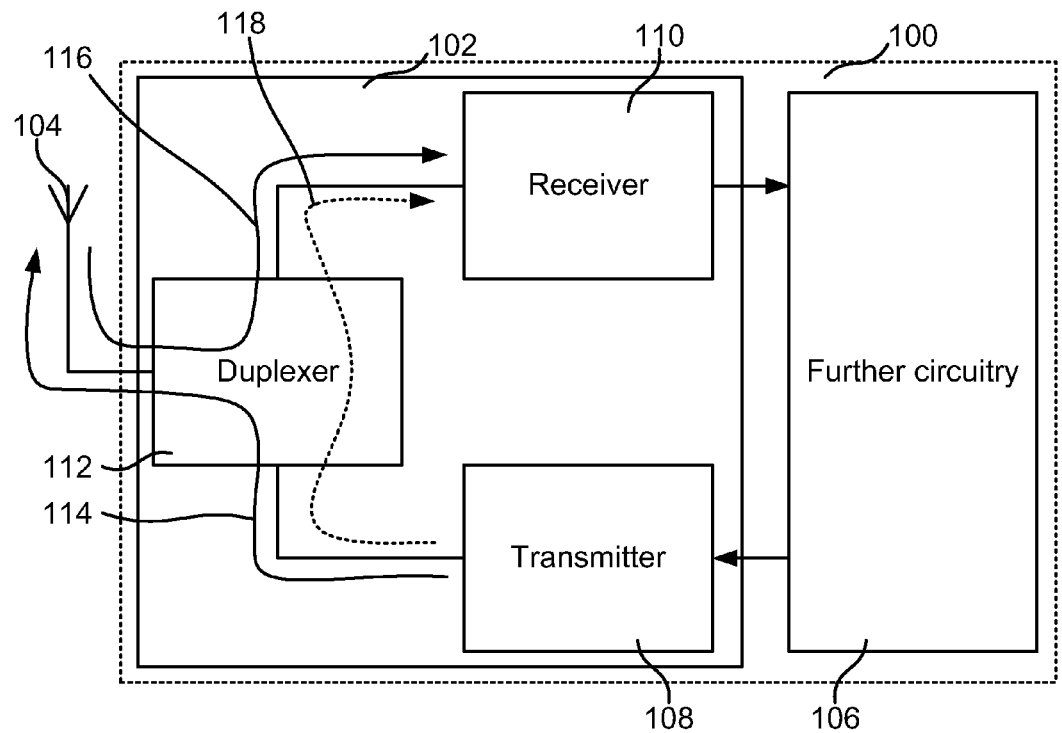
FIG. 1 is a block diagram which schematically illustrates a conventional communication apparatus comprising a transceiver.
Figure 2:
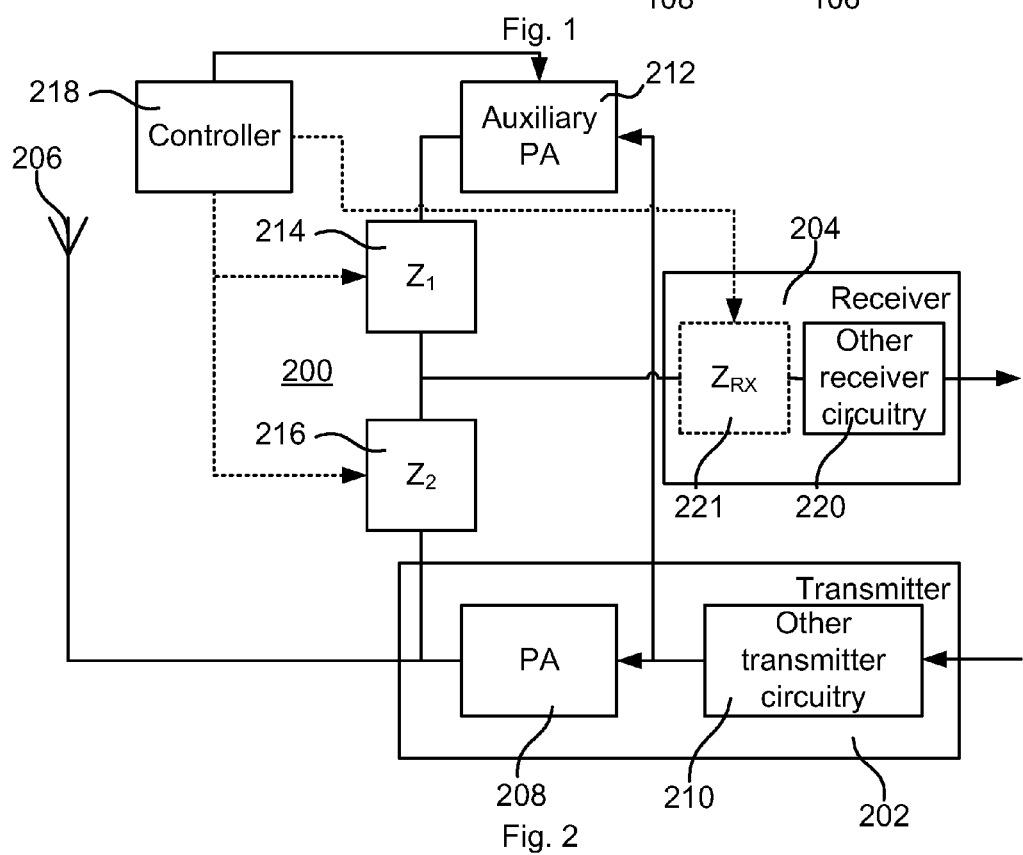
FIG. 2 is a block diagram which schematically illustrates transceiver according to an embodiment.

FIG. 2 is a block diagram which schematically illustrates a transceiver 200 according to an embodiment. The transceiver 200 comprises a transmitter 202, a receiver 204, and a signal transmission arrangement 206, such as the depicted antenna arrangement, or a wired connection. The transmitter 202 comprises a power amplifier (PA) 208, and can also comprise further transmitter circuitry 210, which further transmitter circuitry however is not further discussed in this disclosure since it does not have impact of the inventive contribution to the art. The antenna arrangement 206 is arranged to transmit radio frequency signals provided from the transmitter 202 through its power amplifier 208, and is also arranged to receive radio frequency signals and provide them to the receiver 204. The transceiver 200 further comprises an auxiliary power amplifier 212 which has controllable phase shift and gain. The function of the auxiliary PA 212 will be discussed below. The transceiver 200 also comprises a first impedance element 214 and a second impedance element 216 which have controllable impedances. The function of the first and second impedance elements 214, 216 will be discussed below. The auxiliary PA 212 has its input connected to the input of the PA 208 of the transmitter 202 and its output connected to the first impedance element 214, which is connected between the output of the auxiliary PA and an input of the receiver 204. The second impedance element 216 is connected between an output of the PA 208 of the transmitter 202 and the input of the receiver 204, i.e. the first and second impedance elements 214, 216 are connected in series between the output of the auxiliary PA 212 and the output of the PA 208 of the transmitter 202 as a voltage divider there between, wherein the divided voltage is provided to the input of the receiver 204. This structure will be used for the function demonstrated below. The transceiver 200 also comprises a controller 218 which is arranged to control the auxiliary PA 212, the first impedance element 214 and the second impedance element 216.

By controlling the auxiliary PA 212 to have a phase and amplitude, which when voltage division by the controlled first and second impedance elements 214, 216 between the voltages of the output of the auxiliary PA 212 and the output of the PA 208 of the transmitter 202, the divided voltage can be such that the transmitter contribution to the signal at the input of the receiver is reduced. One example is that the auxiliary PA 212 outputs the same voltage as the PA 208, but with opposite phase, and the first and second impedance elements are controlled to have mutually equal impedances. Here, "opposite phase" should be construed in its technical context where exactly a 180 degree phase shift may not be the optimised value, as for example can be seen in FIG. 8 where the best suppression is reached somewhere between 172 and 173 degrees in that particular example. Due to imperfections, the optimised value may not be reached, at least not at all times, in a real-world implementation, and the ideal situation with total cancelling is in practical implementations not reachable. In an ideal (but fictive) situation, the contribution from the transmitter at the receiver input would however be zero. The ratio between the output of the auxiliary PA 212 and the output of the PA, and corresponding ratio between the first and second impedance elements 214, 216 can be chosen in different ways. Here it should be noted that the second impedance element 216 will also be a part of the reception path from the antenna arrangement 206 to the receiver 204. Thus, the control mechanism can set a restriction for the second impedance element 216 based on receiver properties, and the control is then made on the auxiliary PA 212 and the first impedance element 214 to achieve the reduction of transmitter contribution to the receiver input. The structure provides for a multitude of control strategies, and a selection thereof will be demonstrated below.

Thus, the controller 218 is arranged to control both the auxiliary PA 212, to provide a signal that has a phase and amplitude in relation to the output of the PA 208 of the transmitter 202, and the first and second impedance elements 214, 216 such that the transmitter contribution to the signal at the input of the receiver is reduced. The reader may at this point ask why the parameters are not set to the right values, and the transceiver will work properly. However, the impedance of the signal transmission arrangement can change substantially during operation, for example due to the environment of an antenna such as a handheld device is held in different ways, and due to operation in different frequency bands. But upon considering a particular use case for a transceiver where such phenomena are not present, the controller 212 can be omitted, and the structure demonstrated above can be used with fixed parameters. Thus, the controller is not essential for the operation in all situations.

The receiver 204 can optionally further comprise, in addition to other receiver circuitry 220, which further receiver circuitry however is not further discussed in this disclosure since it does not have impact of the inventive contribution to the art, a receiver impedance element 221 at the input of the receiver 204. The receiver impedance element 221 has controllable impedance, and the controller 218 is arranged to control the receiver impedance element such that the second impedance element 216 and the receiver impedance element 221 together have a resonance frequency equal to a frequency of a signal desired to be received by the receiver 204. This provides for a further degree of freedom in controlling the transceiver.

Figure 3:
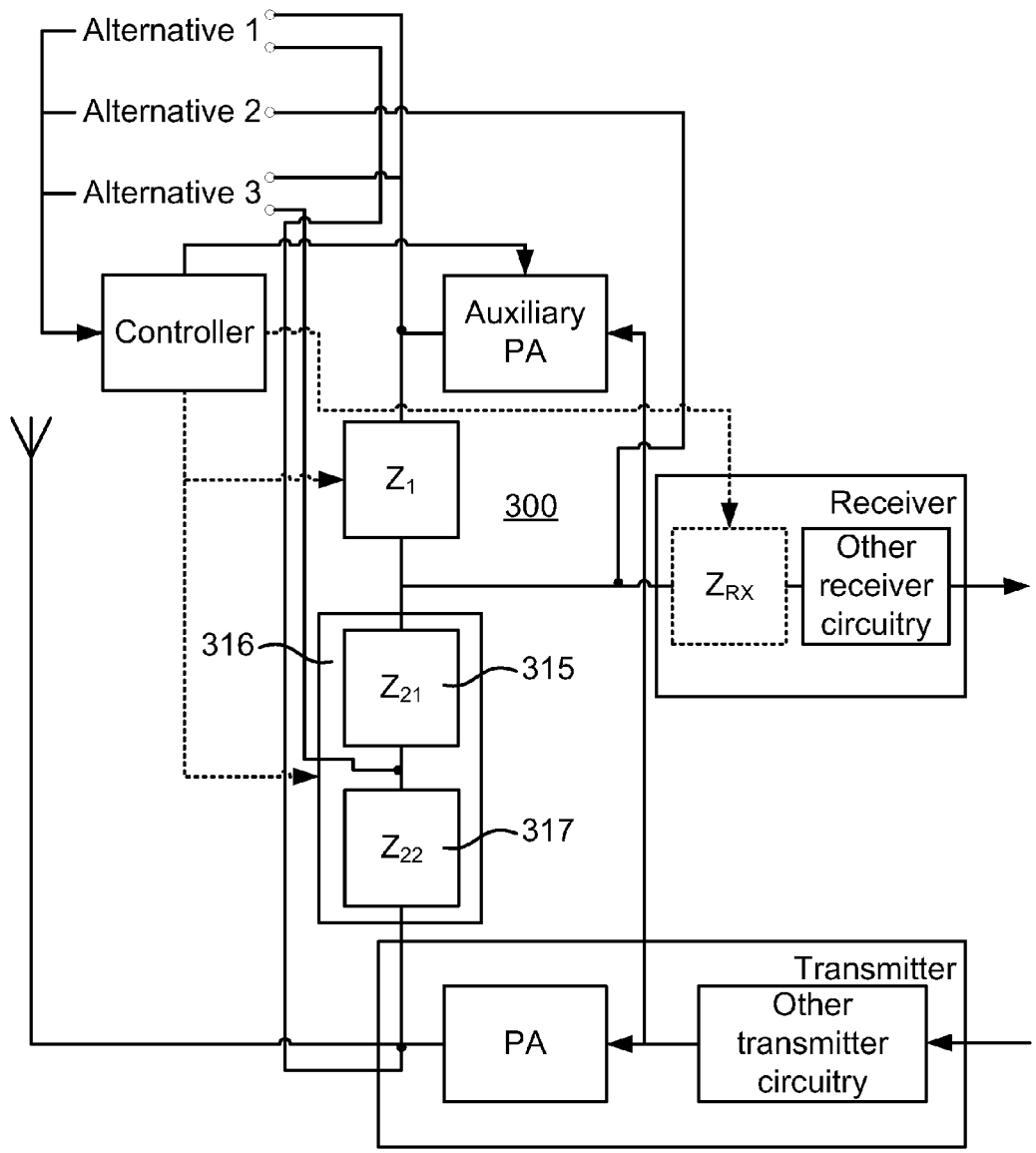
FIG. 3 is a block diagram which schematically illustrates transceiver according to an embodiment.

FIG. 3 is a block diagram which schematically illustrates a transceiver 300 according to an embodiment. In FIG. 3, a number of alternatives for measuring a signal which is significant for the transmitter contribution to the receiver input are illustrated, and will be discussed below. By measuring such significant signal or signals, a feedback structure of the controller can be provided to adaptively control parameters of the controllable elements of the structure. The structure is similar to that illustrated in FIG. 2 except that the second impedance element of FIG. 2 is here substituted by a second impedance element 316 which comprises a first and a second impedance 315, 317 connected in series. This enables a further option for the measurement of the significant signal.

The measurements should be made such that the measurement does not have impact on the radio signals in the reception or transmit paths. By using high input impedance circuitry for the measurements, this can be achieved. For the measurement points indicated as "Alternative 1", the signals at the outputs of the auxiliary PA and the PA of the transmitter are monitored, and based on these signals, the controller is able to perform the control according to the principles discussed above, i.e. to control the phase of the auxiliary PA and control the voltage and/or the impedances of the impedance elements such that the voltage division provides a reduced contribution from the transmitter to the receiver input. Alternatively, the contribution from the transmitter is measured directly at the input of the receiver, as indicated as "Alternative 2". This alternative may also need information, e.g. by measuring for example at PA output of the transceiver, about the transmit signal. Further alternatively, as indicated as "Alternative 3", the measurement can be made from the voltage division of the impedances 315, 317 of the second impedance element 316, wherein for example a fixed relationship between the impedances 315, 317 are chosen as a designed relationship between the output voltages of the auxiliary PA and the PA of the transmitter, and the control mechanism is enabled to be made very simple.

The feedback mechanism of the controller is thus arranged to minimise the contribution from the transmitter at the input of the receiver. The feedback mechanism will then comprise a model for the chosen alternative of measuring, and together with a chosen model for controlling the auxiliary PA and the impedance elements, the controller will provide control signals and the contribution will be kept reduced although changes in signal environment such as antenna impedance and used frequency band.

Figure 4:
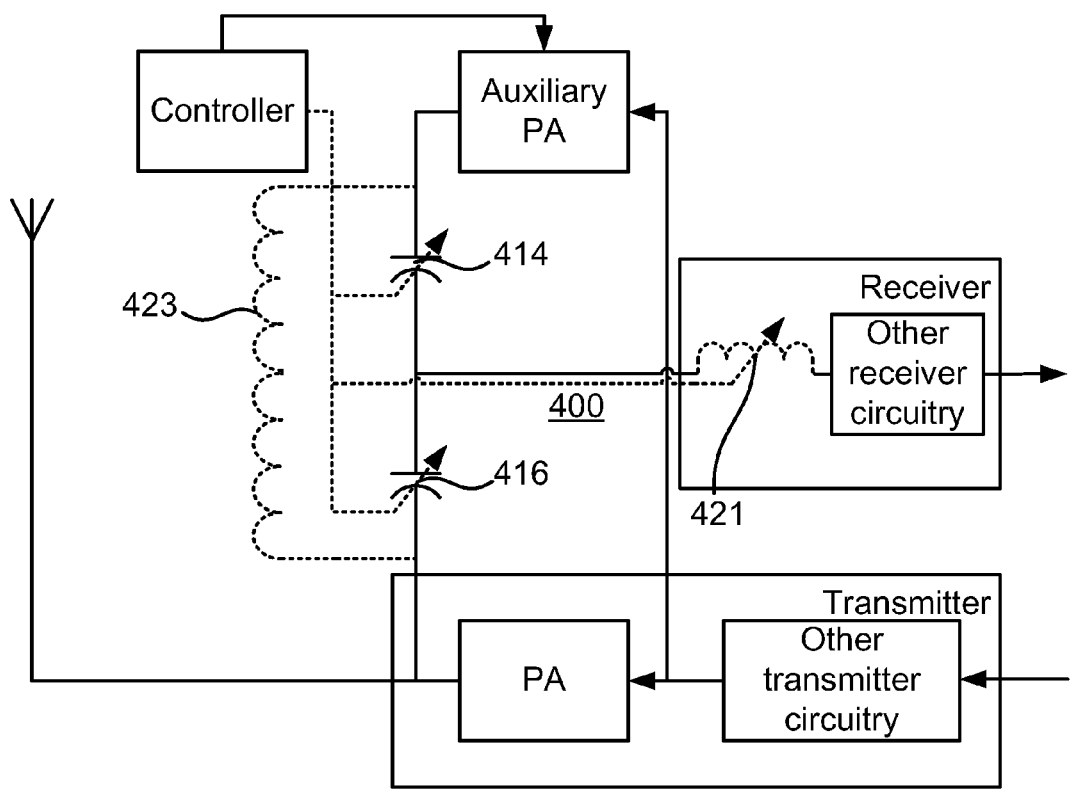
FIG. 4 is a block diagram which schematically illustrates transceiver according to an embodiment.

FIG. 4 is a block diagram which schematically illustrates a transceiver 400 according to an embodiment. The transceiver 400 has a similar structure as the one illustrated in FIG. 2, but where the first and second impedance elements is constituted by a first variable capacitor 414 and a second variable capacitor 416, and the receiver impedance element is an inductor 421 which may be variable. Here, the embodiment illustrated in FIG. 3 with the second impedance element having a first and second impedance can be understood from the embodiment of FIG. 4 to have a first and a second variable capacitor as the first and second impedances.

In FIG. 4, an optional inductor 423 is illustrated, which together with the capacitors 414, 416 form a parallel resonance tank which can be tuned to a frequency of a signal received at the antenna which is desired to be reduced. This frequency can for example be a signal from a wireless local access network node which otherwise would interfere with for example a desired signal from a cellular communication system base station. An additional effect of the optional inductor is that biasing of the PA and the auxiliary PA is facilitated.

The transceiver according to the different embodiments and variants demonstrated above is demonstrated to have a PA and an auxiliary PA. These can be two separate amplifiers, but can also be implemented as a single amplifier with differential output, wherein one of the two differential outputs is considered the output of the PA and the other of the two differential outputs is considered the output of the auxiliary PA.

Figure 5:
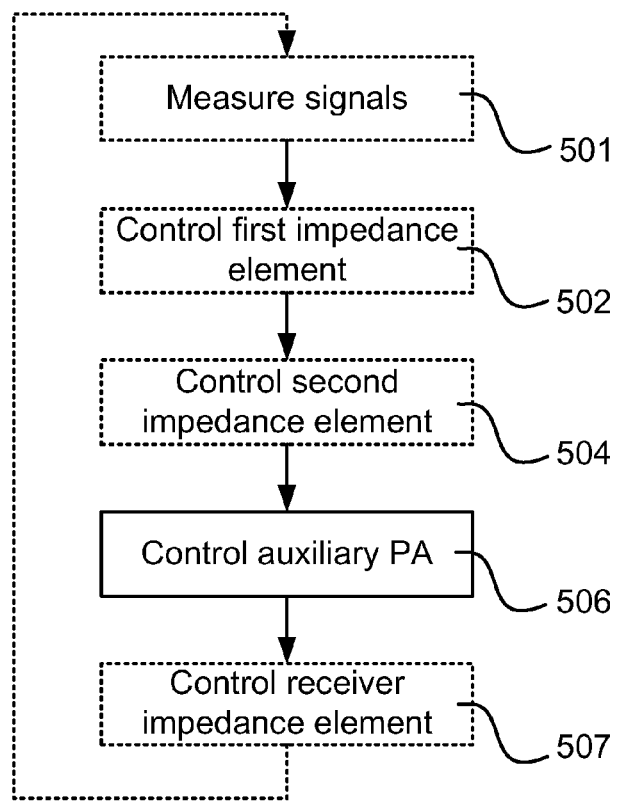
FIG. 5 is a flow chart which schematically illustrates a method according to embodiments.

The transceiver according to the different embodiments and variants demonstrated above are particularly suitable for a communication device capable of frequency division duplex communication in a communication network. The communication device can for example be a user device such as a cell-phone, a network adapter or card for a computer, or a device arranged for machine-to-machine communication. The communication device can be a wireless communication device such as a radio station capable of duplex communication or a cellular communication device, such as a mobile phone, cellular communication card, or Wide Area Network communication device, or a communication device for wired communication, such as a cable modem, a repeater device, or a wired network node. For the case of a wired solution, the antenna arrangement depicted for the transceivers in FIGS. 2 to 4 is substituted with the wired connection. FIG. 5 is a flow chart illustrating a method according to embodiments. Although the illustration is illustrated as a number of steps, the nature of the method is different since the control procedure is preferably performed on real-time basis. The method comprises controlling 502 a first impedance element, controlling 504 a second impedance element and controlling 506 an auxiliary PA of a structure according to any of those demonstrated above. Optionally, signals are measured 501, for example according to those alternatives illustrated in FIG. 3 and discussed in connection therewith. Also optionally, the method can comprise controlling 507 a receiver impedance element as demonstrated above.

Figure 6:
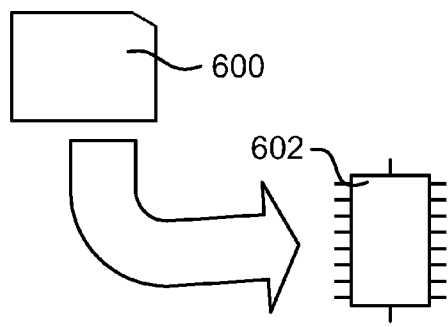
FIG. 6 schematically illustrates a computer program and a processor.

The methods according to the present invention is suitable for implementation with aid of processing means, such as computers and/or processors, especially for the case where the controller demonstrated above is a digital signal processor. Therefore, there is provided computer programs, comprising instructions arranged to cause the processing means, processor, or computer to perform the steps of any of the methods according to any of the embodiments described with reference to FIG. 5. The computer programs preferably comprises program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIG. 5. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements. A particular advantage of the computer program is that the control approach can be applied in a flexible way when using a transceiver in different applications, and/or changing application of a transceiver. The flexible nature of the control in this disclosure makes this particularly advantageous. The new control approach is then applied as a software update.

Figure 7:
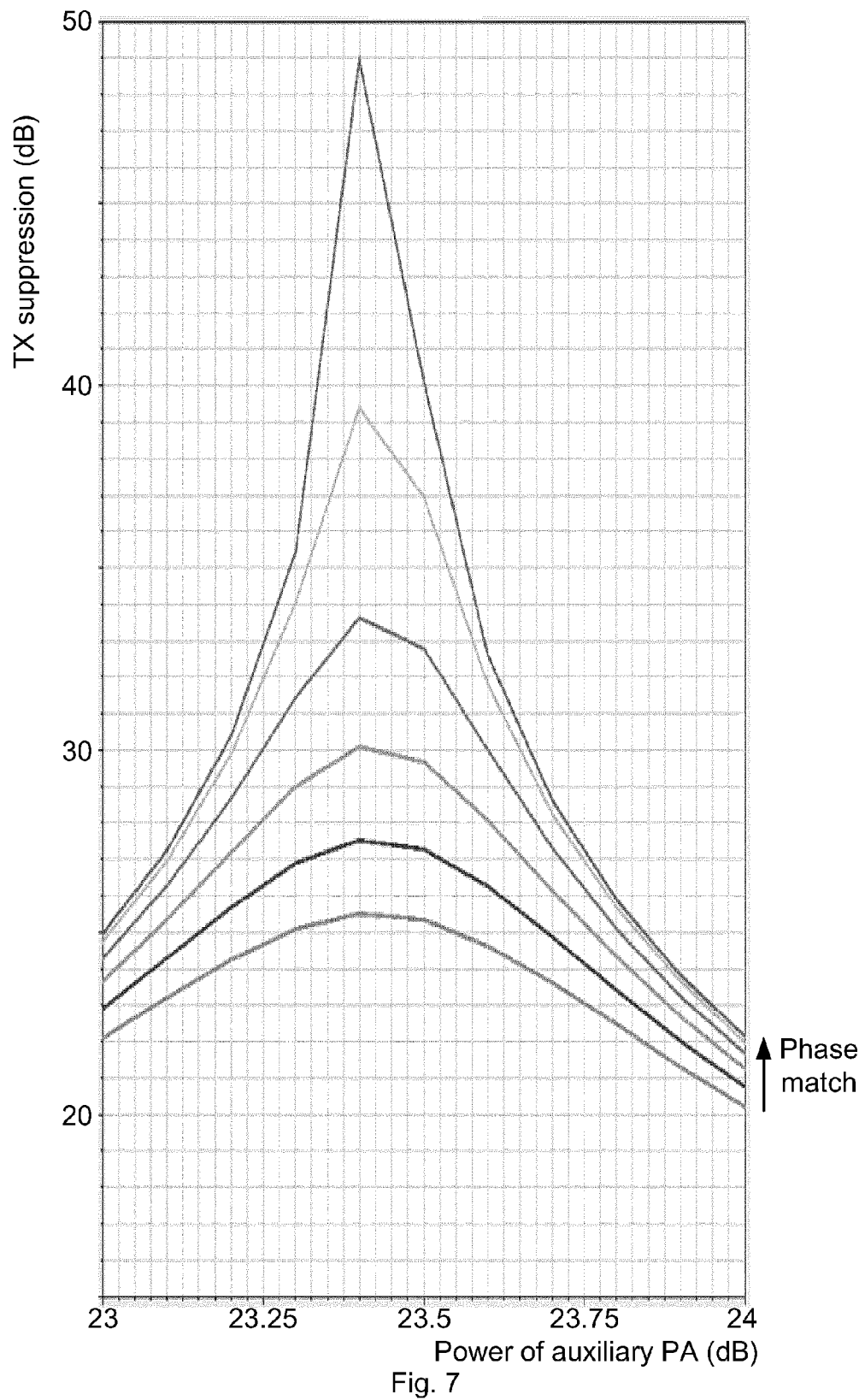
FIG. 7 is a chart illustrating isolation of transmit signal from receiver input for an embodiment.
Figure 8:
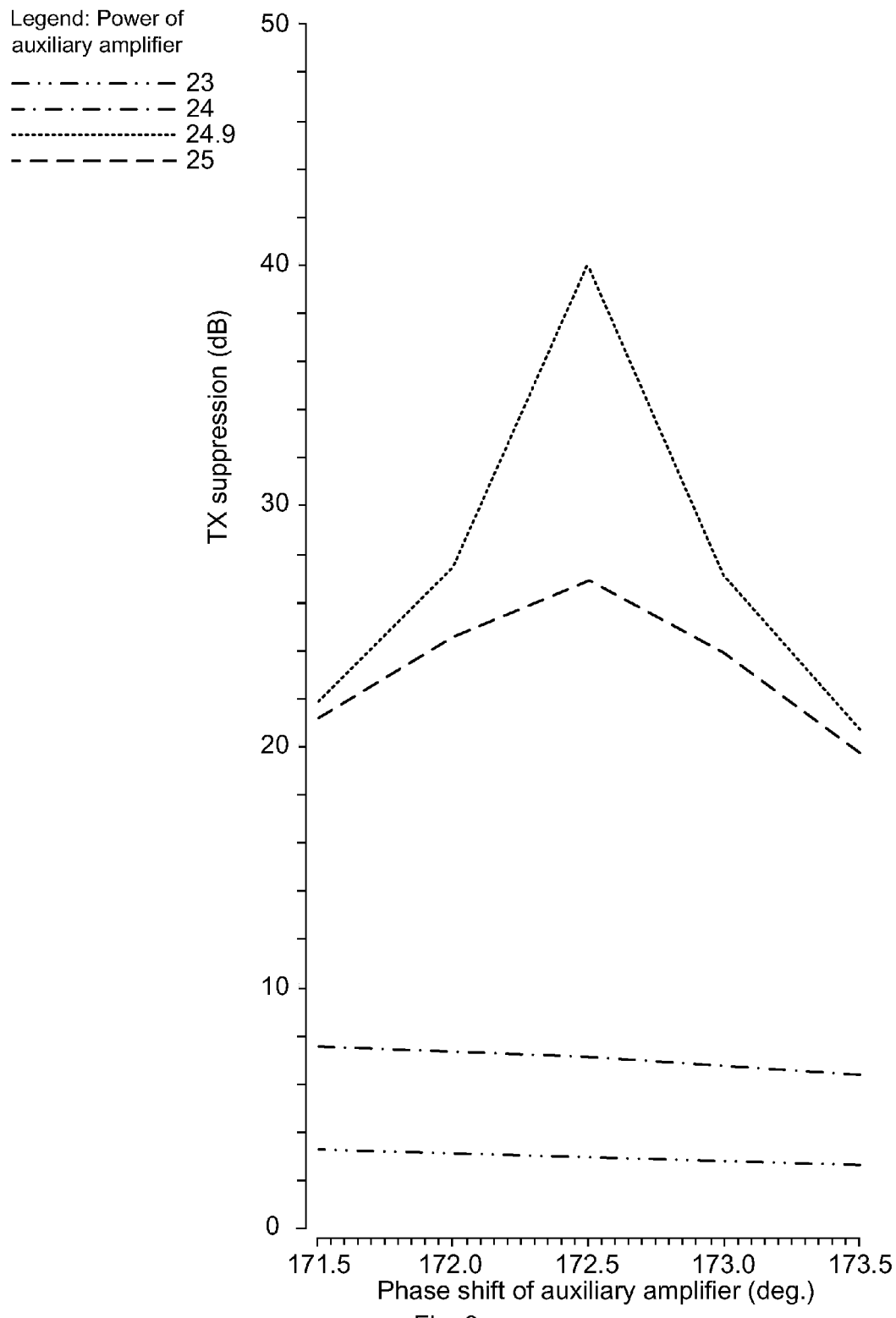
FIG. 8 is a chart illustrating isolation of transmit signal from receiver input for an embodiment employing a resonance tank.
Figure 9:
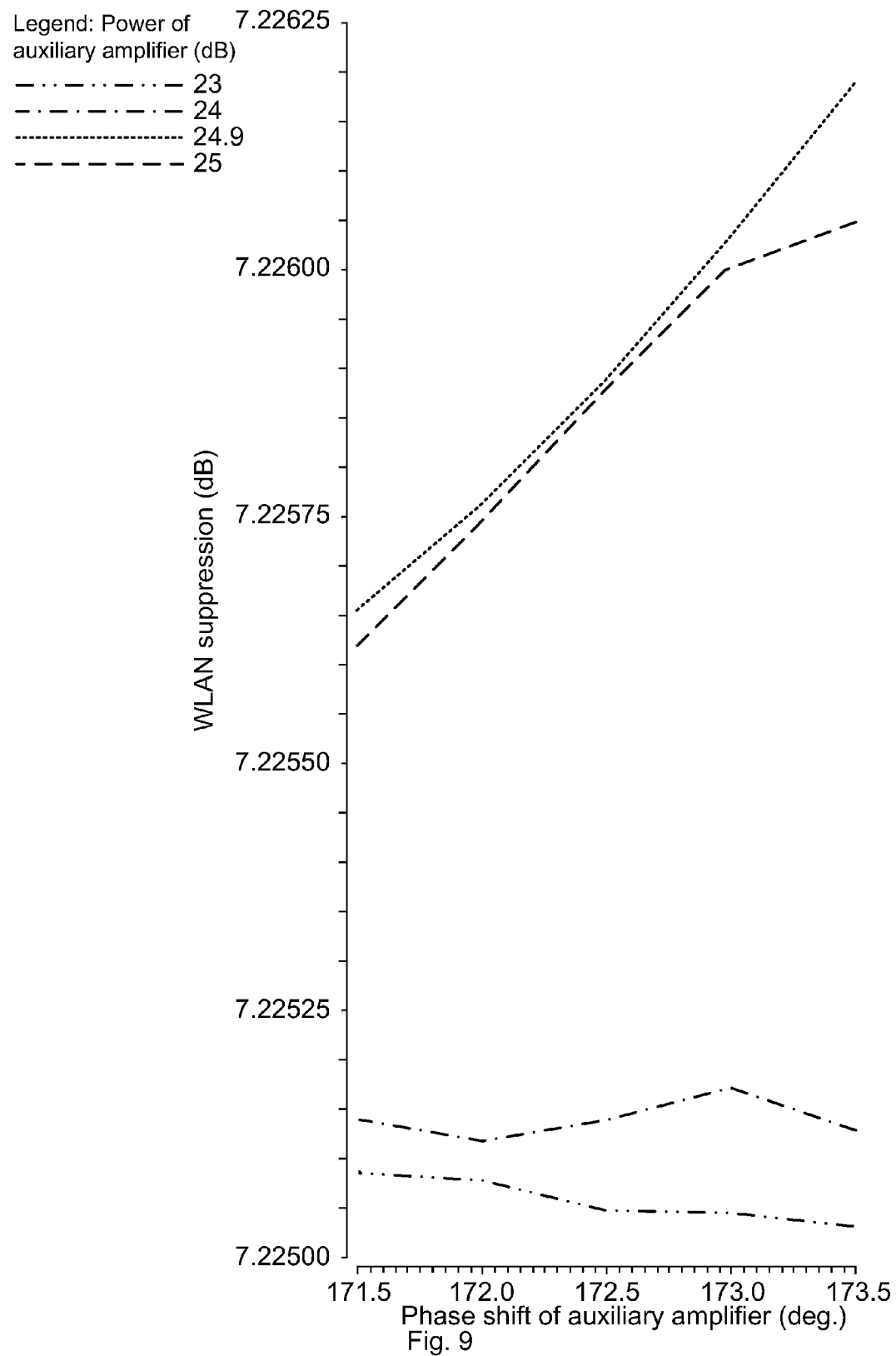
FIG. 9 is a chart illustrating the suppression of an externally received signal desired to be reduced for the same embodiment as of FIG. 8.

FIG. 7 is a chart illustrating suppression of transmit signal from receiver input, for an embodiment, in dB depending on how well the amplitude of the auxiliary PA is matched, where the graphs are for different degrees of how well the phase of the auxiliary PA is matched, as indicated by right hand side arrow. In the example given, the lower curve represents a phase shift between the output of the PA and the auxiliary PA of 209.2 degrees and the upper curve represents a phase shift between the output of the PA and the auxiliary PA of 211.7 degrees. The curves are illustrated for auxiliary PA powers between 23 dB and 24 dB. The absolute values depend on the implementation, e.g. of the first and second impedance elements. FIG. 8 illustrates suppression of transmit signal from receiver input, for the embodiment illustrated in FIG. 4 with the resonance tank, in dB depending on how well the phase of the auxiliary PA is matched, where the graphs are for different degrees of how well the amplitude of the auxiliary PA is matched, as indicated by legend where different amplitudes applied by the auxiliary amplifier for the respective graph are indicated for an example of operation of the PA. Here it can be seen that amplitude matching is important. FIG. 9 is a chart illustrating the suppression of the externally received signal desired to be reduced in dB for corresponding values as of FIG. 8. Here, it can be seen that the reduction is fairly constant (note the dB scale) and a little more than 7 dB, and is thus not heavily affected by the controlling of the suppression of the internal transmitter contribution from the transmitter 430 of FIG. 4. An example is suppression of a WLAN signal not desired at the input of a receiver for cellular communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A transceiver comprising:
a transmitter;
a receiver; and
a signal transmission arrangement,
wherein the transmitter comprises a power amplifier, and the signal transmission arrangement is arranged to transmit signals provided from the transmitter through the power amplifier, and arranged to receive signals and provide them to the receiver, the transceiver further comprising:
an auxiliary power amplifier which has controllable phase shift and gain;
a first impedance element;
a second impedance element; and
a controller, wherein
the auxiliary power amplifier has its input connected to the input of the power amplifier of the transmitter;
the first impedance element is connected between an output of the auxiliary power amplifier and an input of the receiver;
the second impedance element is connected between an output of the power amplifier of the transmitter and the input of the receiver; and
the controller is arranged to control the auxiliary power amplifier to provide a signal that has a phase and amplitude in relation to the output of the power amplifier of the transmitter and the impedances of the first and second impedance elements such that the transmitter contribution at the input of the receiver is suppressed.

2. The transceiver according to claim 1, wherein the first impedance element has controllable impedance, the second impedance element has controllable impedance, and the controller is arranged to control also impedances of the first impedance element and the second impedance element.

3. The transceiver according to claim 2, wherein the output of the auxiliary power amplifier is controlled to have a relation in phase to the output of the power amplifier of the transmitter and to have an amplitude having a relation to the output of the power amplifier of the transmitter, and the first and second impedance elements are controlled to have a corresponding relation of their impedances.

4. The transceiver according to claim 3, wherein the output of the auxiliary power amplifier is controlled to have opposite phase to the output of the power amplifier of the transmitter and to have equal amplitude to the output of the power amplifier of the transmitter, and the first and second impedance elements have equal impedances.

5. The transceiver according to claim 1, wherein the controller is arranged to provide its control by a feedback structure and measure the output of the power amplifier of the transmitter and the output of the auxiliary power amplifier wherein feedback is based on the measurements.

6. The transceiver according to claim 1, wherein the controller is arranged to provide its control by a feedback structure and measure the transmitter contribution at the input of the receiver wherein feedback is based on the measurement.

7. The transceiver according to claim 1, wherein the second impedance element comprises a first and a second impedance connected in series, and the controller is arranged to provide its control by a feedback structure and measure at a point between the first and second impedances of the second impedance element and the output of the auxiliary power amplifier wherein feedback is based on the measurements.

8. The transceiver according to claim 1, further comprising a parallel resonance tank circuit including the first and second impedance elements and a third impedance element connected between the output of the auxiliary power amplifier and the power amplifier of the transmitter, wherein the parallel resonance tank is tuned to a frequency of a signal component received by the signal transmission arrangement that is desired to be suppressed.

9. The transceiver according to claim 1, wherein the receiver further comprises a receiver impedance element at the input of the receiver, the receiver impedance element has controllable impedance, and the controller is arranged to control the receiver impedance element such that the second impedance element and the receiver impedance element together have a resonance frequency equal to a frequency of a signal desired to be received by the receiver.

10. The transceiver according to claim 1, wherein the first and second impedance elements comprise inductors.

11. The transceiver according to claim 1, wherein the first and second impedance elements comprise capacitors.

12. The transceiver according to claim 1, wherein the transceiver is part of a communication device that is capable of frequency division duplex communication in a communication network.

13. A method for controlling a transceiver comprising a transmitter; a receiver; a signal transmission arrangement where the transmitter comprises a power amplifier, and the signal transmission arrangement is arranged to transmit signals provided from the transmitter through its power amplifier, and arranged to receive signals and provide them to the receiver; an auxiliary power amplifier which has controllable phase shift and gain; a first impedance element; and a second impedance element, where the auxiliary power amplifier has its input connected to the input of the power amplifier of the transmitter, the first impedance element is connected between an output of the auxiliary power amplifier and an input of the receiver, and the second impedance element is connected between an output of the power amplifier of the transmitter and the input of the receiver, the method comprising:
controlling the auxiliary power amplifier to provide a signal that has a phase and amplitude in relation to the output of the power amplifier of the transmitter and the impedances of the first and second impedance elements such that the transmitter contribution at the input of the receiver is suppressed.

14. The method according to claim 13, wherein the first impedance element has controllable impedance and the second impedance element has controllable impedance, wherein the method further comprises controlling the impedances of the first and second impedance elements.

15. The method according to claim 14, wherein the controlling further comprises controlling the auxiliary power amplifier to, at its output, have a relation in phase to the output of the power amplifier of the transmitter and to have an amplitude, at its output, having a relation to the output of the power amplifier of the transmitter, and the first and second impedance elements to have a corresponding relation of their impedances.

16. The method according to claim 15, wherein the controlling further comprises controlling the auxiliary power amplifier to have, at its output, opposite phase to the output of the power amplifier of the transmitter and to have, at its output, equal amplitude to the output of the power amplifier of the transmitter, and the first and second impedance elements have equal impedances.

17. The method according to claim 13, further comprising measuring the output of the power amplifier of the transmitter and the output of the auxiliary power amplifier, wherein the controlling is based on feedback control based on the measurements.

18. The method according to claim 13, further comprising measuring the transmitter contribution at the input of the receiver, wherein the controlling is based on a feedback control based on the measurement.

19. The method according to claim 13, wherein the receiver further comprises a receiver impedance element at the input of the receiver, the receiver impedance element has controllable impedance, the method further comprising controlling the impedance of the receiver impedance element such that the second impedance element and the receiver impedance element together have a resonance frequency equal to a frequency of a signal desired to be received by the receiver.

20. A non-transitory programmable controller-readable storage medium comprising computer executable instructions which when executed by a programmable controller of a transceiver causes the controller to perform a method for controlling the transceiver, wherein the transceiver comprises a transmitter; a receiver; a signal transmission arrangement where the transmitter comprises a power amplifier, and the signal transmission arrangement is arranged to transmit signals provided from the transmitter through its power amplifier, and arranged to receive signals and provide them to the receiver; an auxiliary power amplifier which has controllable phase shift and gain; a first impedance element; and a second impedance element, where the auxiliary power amplifier has its input connected to the input of the power amplifier of the transmitter, the first impedance element is connected between an output of the auxiliary power amplifier and an input of the receiver, and the second impedance element is connected between an output of the power amplifier of the transmitter and the input of the receiver, the method comprising:

controlling the auxiliary power amplifier to provide a signal that has a phase and amplitude in relation to the output of the power amplifier of the transmitter and the impedances of the first and second impedance elements such that the transmitter contribution at the input of the receiver is suppressed.

\* \* \* \* \*